C. DIERIG.
TOOL FOR REPAIRING TIRES.
APPLICATION FILED FEB. 11, 1916.

1,215,349.

Patented Feb. 13, 1917.

Inventor.
Conrad Dierig,
by Heard Smith & Tennant.
Attys.

UNITED STATES PATENT OFFICE.

CONRAD DIERIG, OF LAWRENCE, MASSACHUSETTS.

TOOL FOR REPAIRING TIRES.

1,215,349. Specification of Letters Patent. Patented Feb. 13, 1917.

Application filed February 11, 1916. Serial No. 77,756.

*To all whom it may concern:*

Be it known that I, CONRAD DIERIG, a citizen of the United States, residing at Lawrence, county of Essex, State of Massachusetts, have invented an Improvement in Tools for Repairing Tires, of which the following description, in connection with the accompanying drawing, is a specification, like characters on the drawing representing like parts.

This invention has for its object to provide a novel tool or implement for repairing a puncture in the outer shoe or casing of a pneumatic tire. When a pneumatic tire becomes punctured by a small device, such as a nail or a tack, it is desirable to close up the punctured hole in the outer shoe or casing before a new inner tube is put into the shoe because if the punctured hole in the shoe or casing is left unfilled, gravel or dirt is apt to work through said hole into the space between the outer shoe and the inner tube, in which case the inner tube becomes chafed and worn through by the gravel or dirt. Moreover it sometimes happens that when a puncture occurs, the inner layer of fabric of the tire casing will become broken, thus making a rough spot which is apt to chafe through the inner tube when it is put back into the tire.

My invention provides a device by which a puncture thus made in the tire casing can be closed up so as to prevent the passage of any dirt or gravel therethrough, and by which a smooth surface may be provided on the inside of the shoe at the punctured point thereof.

My improvements consist in a novel implement which is adapted to be inserted through the punctured hole made in the tire casing, and by means of which a repair plug can be drawn into said hole, thus completely closing the latter, and also providing a smooth interior surface to the shoe at the punctured point.

In order to give an understanding of my invention, I have illustrated in the drawings a selected embodiment thereof which will now be described, after which the novel features will be pointed out in the appended claim.

Figure 1:
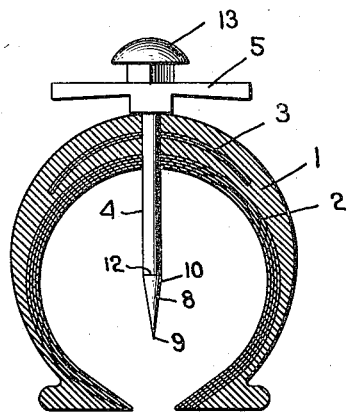
Figure 1 is a sectional view through a tire casing showing my repair tool in use.

1 indicates a tire casing such as is used on automobile tires. These tire casings are usually made of rubber and canvas or other fabric vulcanized together, there being several layers of canvas 2, 3 embedded in the rubber, the layers 2 of canvas being situated close to the inner face of the tire casing.

My improved repair tool comprises a tubular sheath 4 having a head or finger-hold 5 rigidly secured thereto at its outer end, and a core member presenting a shank portion 6 which is adapted to extend through the sheath 4, and a conical or tapered head 8 which is provided with the puncturing point 9. The base or large end 10 of the head 8 has the same diameter as the exterior diameter of the sheath 4, and a shoulder 11 is presented between the large end of the head and the shank portion 6. The core member is adapted to be inserted into the sheath 4 from the inner end thereof, and when said core member is in position, the end 12 of the sheath engages the shoulder 11, as seen best in Fig. 2. Owing to the fact that the exterior diameter of the sheath is the same as the diameter of the base portion 10 of the head 8, the tool will present a smooth exterior surface at the base of the head 8 and the inner end of the sheath 4 when the core member is in its operative position.

Figure 2:
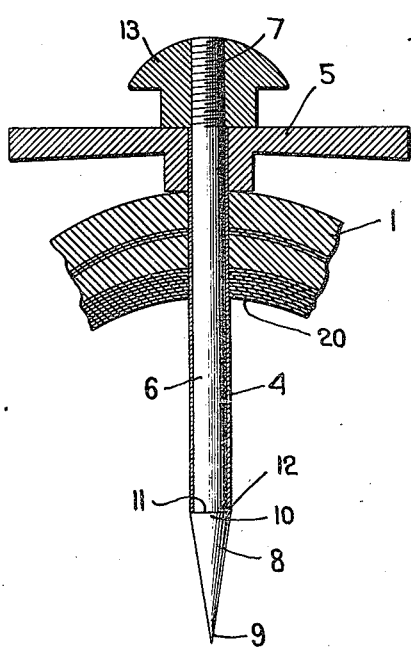
Fig. 2 is an enlarged view showing the repair tool in section.
Figure 5:
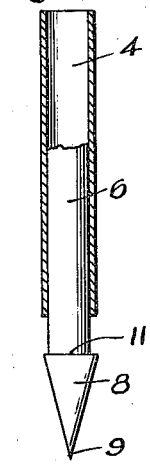
Fig. 5 is a fragmentary detail view of the core member and sheath before fully assembled for use.

The shank 6 of the core member is of sufficient length to project entirely through the sheath 4, and the outer end thereof is screw-threaded as at 7. 13 is a nut which is screw-threaded to the screw-threaded portion 7 of the shank and which operates to hold the core member in the position shown in Figs. 1 and 2 with the shoulder 11 against the end 12 of the sheath.

The tool as thus far described is used for inserting a repair plug into a puncture made in the tire casing 1. This repair plug is formed with a stem 14 of a size to be inserted into the sheath 4 and the head 15 of rubber or similar material that is provided on its exterior with a facing 16 of canvas. The head of the repair plug will be circular in shape and two or three inches in diameter, and the thickness of the head at the central portion 17 thereof will be about equal to the diameter of the stem 14.

Figure 3:
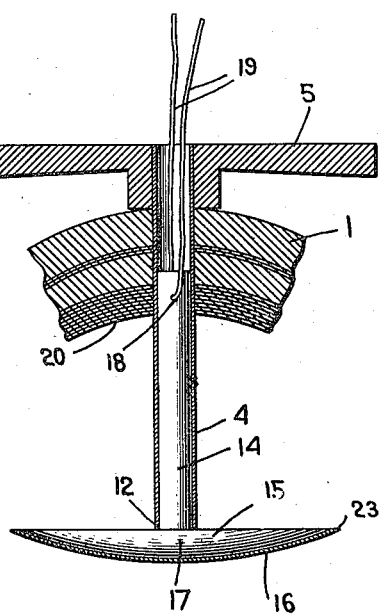
Fig. 3 shows the manner of inserting the plug into the sheath of the repair tool preparatory to drawing the plug into the shoe.
Figure 4:
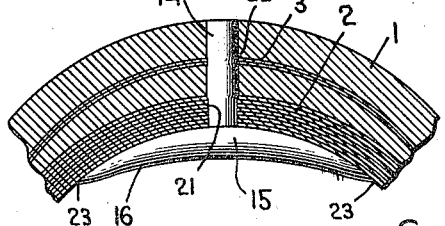
Fig. 4 is a section showing the tire casing after the repair has been effected.

In order to use my improved outfit it is necessary either to remove the tire casing entirely from the wheel or at least to remove one side thereof so that access can be had to the interior of the shoe. After the punctured inner tube has been taken out from the shoe, the tool will be inserted through the puncture, as shown in Figs. 1 and 2. Before this is done the core member and sheath are assembled, as shown in Fig. 2, that is, the core member is inserted into the inner end of the sheath until the shoulder 11 engages the end 12 of the sheath and the nut 13 is then applied to clamp the parts in this position. The tool thus assembled is inserted carefully through the puncture made in the tire casing and because of the construction of the tool involving the shoulder 11 against which the end 12 of the sheath engages, the tool will present an absolutely smooth exterior surface without any projections or shoulders that can catch in the fabric of the tire casing and tear or injure the threads thereof. The insertion of the tool into the punctured hole merely operates to spread the material of the tire casing and to open up the threads of the fabric 2 and 3. After the tool has been thus inserted, as shown in Figs. 1 and 2, the nut 13 is unscrewed and the core member is removed from the inner end of the sheath 4. The stem of the repair plug is then inserted into the inner end of the sheath 4 until the end 12 of the stem engages the head 15 thereof, as shown in Fig. 3. The stem of the repair plug will preferably have an aperture 18 therein through which a string or cord 19 may be threaded before said stem is introduced into the sheath. The purpose of this cord is for holding the plug firmly in the sheath. When the plug has thus been introduced, the sheath is carefully withdrawn from the tire casing, the plug being held in the sheath in the position shown in Fig. 3, this operation resulting in drawing the stem 14 of the plug up into the aperture which the sheath occupied. In performing this operation, the operator will draw on the cord 19 sufficiently so that the head of the plug will be drawn tightly against the inner surface 20 of the tire casing. After the plug has been drawn up in position the sheath is entirely removed from the tire casing. The natural resiliency and tension of the layers of fabric 2 and 3 will cause them to contract slightly after the sheath is removed, and in so doing they will pinch the stem 14 of the plug, as shown at 21 and 22. The stem 14 of the plug has a greater length than the thickness of the thread of the tire casing so that when the plug has been placed in position it will extend beyond the outer periphery of the tire casing. This projecting portion is cut off flush with the surface of the casing, as shown in Fig. 4.

The head 15 of the plug is of sufficient size so that it will cover up any roughness or crack in the fabric caused by the puncture, and the canvas covering 16 of the plug makes a firm surface for the inner tube to rest against. It will be noted that the plug is made thickest at the center and tapers to a thin edge 23, and, therefore, when the plug is in place, it will present a comparatively smooth surface for the inner tube. The plug will be held in place firmly by the binding action of the layers of fabric 2 and 3 on the stem 14, as shown in Fig. 4.

An important feature of the invention is the construction by which the tool is formed with a perfectly smooth exterior surface which permits it to be inserted through the puncture in the tire casing without catching on or tearing any of the threads of the fabric.

By means of my invention it is possible to readily repair the damage done to the shoe or casing by a puncture. Another important advantage of the invention is that it prevents blow-outs as the repair plug reinforces the fabric at the point where the puncture occurs. My device, therefore, often takes the place of a blow-out patch and since the aperture made in the casing is permanently sealed by means of the stem of the plug, there is no chance for any gravel or dirt to work its way into the interior of the casing. The stem 14 plugs up the hole made by the puncture so as to prevent anything from working into the tube from the outside and the head of the plug not only reinforces the fabric of the shoe or casing, but also acts as a blow-out patch to prevent the inner tube from being forced into the hole, and otherwise to prevent injury to the inner tube.

While I have illustrated herein a selected embodiment of my invention, I do not wish to be limited to the constructional features shown.

I claim:

In a tool for repairing tires, the combination with a tubular sheath, of a core member presenting a shank portion and a head portion, said shank portion having a diameter which permits it to be inserted into the sheath, said head portion having a conical shape, the diameter of the head portion at the base thereof being equal to the exterior diameter of the sheath, forming a shoulder between the shank and head portion of the core member against which the inner end of the sheath abuts when the core and sheath are assembled, whereby a smooth exterior surface is presented at the point between the core member and sheath.

In testimony whereof, I have signed my name to this specification.

CONRAD DIERIG.